US008071709B2

(12) United States Patent
Kishine et al.

(10) Patent No.: US 8,071,709 B2
(45) Date of Patent: Dec. 6, 2011

(54) COMPOSITE MATERIAL COMPRISING FLOURINE-CONTAINING RUBBER, FUEL-IMPERMEABLE SEALING MATERIAL COMPRISING SAME, AND PROCESS FOR PREPARING COMPOSITE MATERIAL

(75) Inventors: Mitsuru Kishine, Settsu (JP); Hirofumi Nishibayashi, Settsu (JP); Toshiki Ichisaka, Settsu (JP); Kazuo Kobayashi, Ichihara (JP); Ryuji Tachibana, Ichihara (JP); Tadashi Okawa, Ichihara (JP); Katsumi Kihara, Chiyoda (JP)

(73) Assignees: Daikin Industries, Ltd., Osaka (JP); Dow Corning Corporation, Midland, MI (US)

( * ) Notice: Subject to any disclaimer, the term of this patent is extended or adjusted under 35 U.S.C. 154(b) by 418 days.

(21) Appl. No.: 12/282,664

(22) PCT Filed: Mar. 14, 2007

(86) PCT No.: PCT/JP2007/055067
§ 371 (c)(1),
(2), (4) Date: Sep. 12, 2008

(87) PCT Pub. No.: WO2007/105754
PCT Pub. Date: Sep. 20, 2007

(65) Prior Publication Data
US 2009/0076224 A1    Mar. 19, 2009

(30) Foreign Application Priority Data

Mar. 15, 2006  (JP) ................................ 2006-070440

(51) Int. Cl.
*C08G 77/24* (2006.01)
(52) U.S. Cl. .......................................... 528/36; 525/479
(58) Field of Classification Search .................... 528/36; 525/479
See application file for complete search history.

(56) References Cited

U.S. PATENT DOCUMENTS

| | | | | |
|---|---|---|---|---|
| 4,985,483 | A * | 1/1991 | Saito et al. ................. | 524/265 |
| 6,676,996 | B2 * | 1/2004 | Pickering et al. ............ | 427/365 |
| 2009/0203846 | A1 * | 8/2009 | Park et al. .................. | 525/198 |

FOREIGN PATENT DOCUMENTS

| | | |
|---|---|---|
| EP | 0 365 967 A1 | 10/1989 |
| EP | 0 330 200 A1 | 2/2009 |
| JP | 62243621 | 10/1987 |
| JP | 63202658 | 8/1988 |
| JP | 1242650 | 9/1989 |
| JP | 4180930 | 6/1992 |
| JP | 4180931 | 6/1992 |
| JP | 2000007835 | 1/2000 |
| JP | 2001240679 | 9/2001 |
| JP | 2004346087 | 12/2004 |
| JP | 2005528516 | 9/2005 |
| WO | 03/104323 A1 | 12/2003 |
| WO | 2006/030774 A1 | 3/2006 |

OTHER PUBLICATIONS

International Search Report and Written Opinion dated Apr. 17, 2007 pertaining to International Application No. PCT/JP2007/055067.
European Search Report Application No. 07738538.3 dated Jun. 6, 2011.

* cited by examiner

*Primary Examiner* — Kuo-Liang Peng
(74) *Attorney, Agent, or Firm* — Dinsmore & Shohl LLP

(57) ABSTRACT

The present invention provides a novel fluorine-containing rubber composite material having both of excellent fuel impermeability and excellent cold resistance, a fuel impermeable sealing material comprising the composite material and a process for preparing the composite material. The fluorine-containing rubber composite material comprises crosslinked particles of fluorine-containing silicone rubber dispersed in a fluorine-containing rubber. It is preferable that the fluorine-containing rubber comprises a vinylidene fluoride/tetrafluoroethylene/perfluoro vinyl ether copolymer, and the composite material has cold resistance of not more than $-35°$ C. and fuel permeability of not more than 500 g·mm/m$^2$·day. The fuel impermeable sealing material comprises the composite material. The process for preparing the composite material comprises a step for co-coagulation of a fluorine-containing rubber emulsion and an emulsion of crosslinked fluorine-containing silicone rubber.

6 Claims, No Drawings

COMPOSITE MATERIAL COMPRISING FLOURINE-CONTAINING RUBBER, FUEL-IMPERMEABLE SEALING MATERIAL COMPRISING SAME, AND PROCESS FOR PREPARING COMPOSITE MATERIAL

TECHNICAL FIELD

The present invention relates to a novel composite material comprising fluorine-containing rubber and having excellent fuel impermeability and excellent cold resistance, to a fuel-impermeable sealing material comprising the composite material, and to a process for preparing the composite material.

BACKGROUND ART

Fluorine-containing rubbers are excellent in characteristics such as fuel impermeability, sliding property, heat resistance, chemical resistance, weather resistance and electrical properties, and are used in various fields such as automobiles, industrial machinery, office automation equipment and electrical and electronic equipment.

For example, in the field of automobiles, fluorine-containing rubbers are used as a sealing material for an engine and peripheral equipment thereof, automatic transmission, fuel system and peripheral equipment thereof and the like. However as a result of recent strict control of environmental regulations, regulations on SHED (Sealed Housing for Evaporative Determination) have been made more rigorous, and especially development of rubber materials for fuel system having fuel impermeability is demanded. Rubber materials for fuel system are required to have various characteristics such as processability, oil resistance and cold resistance in addition to fuel impermeability, and fluorine-containing rubbers are not satisfactory enough to meet such requirements because they are inferior in cold resistance though fuel impermeability is excellent.

Further in the case of engines for cars, strict conditions for use thereof are demanded, for example, injection of high pressure air-fuel mixed gas directly into a combustion chamber is carried out for the purposes of increasing specific fuel consumption and reducing exhausted carbon dioxide. As a result, when a fluorine-containing rubber being inferior in cold resistance is used for high pressure sealing, there is a problem that when a temperature is lower than a glass transition temperature, rubber elasticity is lost and sealing of a high pressure fuel gas becomes difficult.

In order to solve this problem, various studies have been made with respect to composite materials prepared by combining a fluorine-containing rubber being excellent in fuel impermeability and a silicone rubber being excellent in cold resistance. Those two kinds of rubbers have property of making up for disadvantages of each other, and therefore it is expected that a new material can be provided if they are well combined in the form of a blend, an alloy or the like.

For example, JP-A-1-198646 discloses a rubber composition obtained by dynamically crosslinking a silicone rubber (I), an elastomer (II) which is not crosslinked only with an organic peroxide, a co-crosslinkable elastomer (III) which is co-crosslinkable with the silicone rubber (I) with an organic peroxide and co-crosslinkable with the elastomer (II), and an organic peroxide. In the case of the rubber composition disclosed in JP-A-1-198646, by crosslinking the silicone rubber (I) and the elastomer (III) to be added as case demands simultaneously when mixing, a system is fixed while a satisfactory dispersed state is maintained, and then the elastomer (II) is crosslinked at molding. In this method, since the crosslinking of the silicone rubber is carried out during mixing, a shape of the silicone rubber hardly becomes spherical, which makes it difficult to maintain continuity of the matrix phase and enhance fuel impermeability. In addition, studies are not made concretely by using cold resistant fluorine-containing rubbers.

Also JP-A-1-242650 discloses a fluorine-containing rubber composition comprising a fluorine-containing rubber and crosslinked silicone rubber particles having an average particle size of not more than 10 μm. However, there is no disclosure as to crosslinked fluorine-containing silicone rubber particles. In the method disclosed therein, the crosslinked silicone rubber particles do not have a functional group, interlayer adhesion is not satisfactory and a sufficient tensile strength is not obtained. In addition, studies are not made concretely by using cold resistant fluorine-containing rubbers.

As mentioned above, there have been no fluorine-containing composite materials having both of improved fuel impermeability and improved cold resistance.

DISCLOSURE OF INVENTION

The present invention provides a novel composite material comprising fluorine-containing rubber and having both of excellent fuel impermeability and excellent cold resistance, a fuel impermeable sealing material prepared therefrom, and a process for preparing the composite material.

Namely, the present invention relates to a composite material comprising fluorine-containing rubber, in which crosslinked fluorine-containing silicone rubber particles are dispersed in a fluorine-containing rubber.

It is preferable that the fluorine-containing rubber comprises a vinylidene fluoride/tetrafluoroethylene/perfluoro vinyl ether copolymer, and the composite material has cold resistance of not more than −30° C., further not more than −35° C. and fuel permeability of not more than 500 g·mm/m$^2$·day.

It is preferable that the crosslinked fluorine-containing silicone rubber particles have a functional group having reactivity with the fluorine-containing rubber.

It is preferable that the functional group of the crosslinked fluorine-containing silicone rubber particles is a functional group having reactivity in peroxide crosslinking.

It is preferable that the crosslinked fluorine-containing silicone rubber particles are those subjected to curing by a condensation reaction.

It is preferable that an average particle size of the crosslinked fluorine-containing silicone rubber particles is preferably not more than 100 μm, further preferably not more than 10 μm.

Also the present invention relates to a fuel impermeable sealing material comprising the above-mentioned composite material.

Further the present invention relates to a process for preparing the above-mentioned composite material which comprises a step of co-coagulating an emulsion of a fluorine-containing rubber and an emulsion of crosslinked fluorine-containing silicone rubber.

BEST MODE FOR CARRYING OUT THE INVENTION

The present invention relates to the composite material comprising fluorine-containing rubber, in which the crosslinked fluorine-containing silicone rubber particles are dispersed in the fluorine-containing rubber.

A fluorine-containing rubber used in the present invention is not limited particularly. From the point that cold resistance of not more than −35° C. can be imparted to the composite material of the present invention, it is preferable that the fluorine-containing rubber comprises a vinylidene fluoride (hereinafter referred to as VdF)/tetrafluoroethylene (hereinafter referred to as TFE)/perfluoro vinyl ether (hereinafter referred to as PFVE) copolymer.

Also it is preferable that the fluorine-containing rubber is capable of peroxide-crosslinking, from the viewpoint of excellent chemical resistance and fuel oil resistance and easy co-crosslinking with the silicone rubber.

Among VdF/TFE/PFVE copolymers, preferable is a copolymer comprising 40 to 80% by mole of VdF unit, 3 to 40% by mole of TFE unit and 15 to 35% by mole of PFVE unit, and more preferable is a copolymer comprising 60 to 80% by mole of VdF unit, 3 to 25% by mole of TFE unit and 15 to 30% by mole of PFVE unit. When the amounts of the respective structural units are within the above-mentioned ranges, requirements for cold resistance, rubber elasticity and production cost are satisfied.

The proportion of the above-mentioned VdF/TFE/PFVE copolymer in the fluorine-containing rubber is preferably not less than 50% by weight, more preferably not less than 80% by weight, further preferably not less than 90% by weight, especially preferably not less than 95% by weight.

Examples of crosslinkable fluorine-containing rubbers which can be used in the present invention other than the above-mentioned VdF/TFE/PFVE copolymers are non-perfluoro fluorine-containing rubbers (a) and perfluoro fluorine-containing rubbers (b). The perfluoro fluorine-containing rubber is one comprising not less than 90% by mole of perfluoro monomer in the component units thereof.

Examples of the non-perfluoro fluorine-containing rubbers (a) are VdF type fluorine-containing rubbers (excluding the above-mentioned VdF/TFE/PFVE copolymers), TFE/propylene type fluorine-containing rubbers, TFE/propylene/VdF type fluorine-containing rubbers, ethylene/hexafluoropropylene (hereinafter referred to as HFP) type fluorine-containing rubbers, ethylene/HFP/VdF type fluorine-containing rubbers, ethylene/HFP/TFE type fluorine-containing rubbers, fluorophosphazene type fluorine-containing rubbers, and the like. Those rubbers can be used alone or can be used in an optional combination thereof to such an extent not to impair the effect of the present invention.

Examples of the VdF type fluorine-containing rubbers (excluding the above-mentioned VdF/TFE/PFVE copolymers) are rubbers represented by the following general formula (1):

$$-(M^1)-(M^2)-(N^1)- \quad (1)$$

wherein the structural unit $M^1$ is a structural unit derived from VdF ($m^1$), the structural unit $M^2$ is a structural unit derived from a fluorine-containing ethylenic monomer ($m^2$), and the structural unit $N^1$ is a repeat unit derived from a monomer ($n^1$) copolymerizable with the monomer ($m^1$) and the monomer ($m^2$).

Among the VdF type fluorine-containing rubbers represented by the general formula (1), preferable is a rubber comprising 30 to 85% by mole of the structural unit $M^1$ and 70 to 15% by mole of the structural unit $M^2$, and more preferable is a rubber comprising 50 to 80% by mole of the structural unit $M^1$ and 55 to 15% by mole, further 50 to 20% by mole of the structural unit $M^2$. It is preferable that the structural unit $N^1$ is contained in an amount of 0 to 20% by mole based on the total amount of the structural unit $M^1$ and the structural unit $M^2$.

There can be used, as the fluorine-containing ethylenic monomer ($m^2$), at least one monomer, for example, fluorine-containing monomers such as TFE, chlorotrifluoroethylene (CTFE), trifluoroethylene, HFP, trifluoropropylene, tetrafluoropropylene, pentafluoropropylene, trifluorobutene, tetrafluoroisobutene, perfluoroalkyl vinyl ether (hereinafter referred to as PAVE) and vinyl fluoride. In addition, there can be used perfluoroalkoxy vinyl ethers disclosed in JP-T-2004-527596 and represented by the following formula:

$$CF_2=CF(O(CF_2)_n)_m(OCF_2)_xOR_f$$

wherein "n" is an integer of 1 to 6, "m" is an integer of 1 to 3, "x" is 0 or an integer of 1 to 3, $R_f$ is a perfluoroalkyl group having 1 to 6 carbon atoms. Of these monomers, TFE, HFP and PAVE are preferable.

With respect to the monomer ($n^1$), any of monomers copolymerizable with the monomer ($m^1$) and the monomer ($m^2$) may be used. Examples thereof are, for instance, ethylene, propylene and alkyl vinyl ether.

Also monomers providing a cure site are preferable as the monomer ($n^1$).

Examples of such a monomer as providing a cure site are iodine- or bromine-containing monomers represented by the general formula (2):

$$CY^1{}_2=CY^1-R_f{}^1CHR^1X^1 \quad (2)$$

wherein $Y^1$ is hydrogen atom, a fluorine atom or $-CH_3$; $R_f{}^1$ is a fluoroalkylene group, a perfluoroalkylene group, a fluoropolyoxyalkylene group or a perfluoropolyoxyalkylene group; $R^1$ is hydrogen atom or $-CH_3$; $X^1$ is an iodine atom or a bromine atom, monomers represented by the general formula (3):

$$CF_2=CFO(CF_2CF(CF_3)O)_m(CF_2)_n-X^2 \quad (3)$$

wherein "m" is 0 or an integer of 1 to 5; "n" is an integer of 1 to 3; $X^2$ is a bromine atom or an iodine atom, and monomers represented by the general formula (4):

$$CH_2=CH(CF_2)_pI \quad (4)$$

wherein "p" is an integer of 1 to 10, and for example, there are iodine-containing monomers disclosed in JP-B-5-63482 and JP-A-7-316234 such as perfluoro(6,6-dihydro-6-iodo-3-oxa-1-hexene) and perfluoro(5-iodo-3-oxa-1-pentene), iodine-containing monomers disclosed in JP-A-4-217936 such as $CF_2=CFOCF_2CF_2CH_2I$, iodine-containing monomers disclosed in JP-A-61-55138 such as 4-iodo-3,3,4,4-tetrafluoro-1-butene, bromine-containing monomers disclosed in JP-T-4-505341, and the like. Those monomers can be used alone or can be used in an optional combination thereof.

Preferable examples of such a VdF type fluorine-containing rubber are a VdF/HFP type rubber, a VdF/HFP/TFE type rubber, a VdF/CTFE type rubber, a VdF/CTFE/TFE type rubber, and the like.

Preferable as the TFE/propylene type fluorine-containing rubber are those represented by the following general formula (5):

$$-(M^3)-(M^4)-(N^2)- \quad (5)$$

wherein the structural unit $M^3$ is a structural unit derived from TFE ($m^3$), the structural unit $M^4$ is a structural unit derived from propylene ($m^4$), and the structural unit $N^2$ is a repeat unit derived from a monomer ($n^2$) copolymerizable with the monomer ($m^3$) and the monomer ($m^4$).

Among the TFE/propylene type fluorine-containing rubbers represented by the general formula (5), preferable is a rubber comprising 40 to 70% by mole of the structural unit $M^3$ and 60 to 30% by mole of the structural unit $M^4$ and more preferable is a rubber comprising 50 to 60% by mole of the structural unit $M^3$ and 50 to 40% by mole of the structural unit $M^4$. It is preferable that the structural unit $N^2$ is contained in an amount of 0 to 40% by mole based on the total amount of the structural unit $M^3$ and the structural unit $M^4$.

With respect to the monomer ($n^2$), any of monomers copolymerizable with the monomer ($m^3$) and the monomer ($m^4$) may be used, and preferable are monomers providing a cure site. Examples thereof are, for instance, VdF, ethylene and the like.

Preferable as the perfluoro fluorine-containing rubber (b) are those represented by the following general formula (6):

$$-(M^5)-(M^6)-(N^3)- \qquad (6)$$

wherein the structural unit $M^5$ is a structural unit derived from TFE ($m^5$), the structural unit $M^6$ is a structural unit derived from PAVE or perfluoro(alkoxy vinyl ether) ($m^6$), and the structural unit $N^3$ is a repeat unit derived from a monomer ($n^3$) copolymerizable with the monomer ($m^5$) and the monomer ($m^6$).

Among the perfluoro fluorine-containing rubbers (b) represented by the general formula (6), preferable is a rubber comprising 50 to 90% by mole of the structural unit $M^5$ and 10 to 50% by mole of the structural unit $M^6$ and more preferable is a rubber comprising 50 to 80% by mole of the structural unit $M^5$ and 20 to 50% by mole of the structural unit $M^6$. It is preferable that the structural unit $N^3$ is contained in an amount of 0 to 5% by mole, more preferably 0 to 2% by mole based on the total amount of the structural unit $M^5$ and the structural unit $M^6$. If the proportions thereof are beyond the above-mentioned ranges, there is a tendency that elastic properties of rubber are lost and the rubber comes to have properties close to those of a resin.

Examples of PAVE ($m^6$) are, for instance, perfluoro(methyl vinyl ether), perfluoro(propyl vinyl ether), and the like, which can be used alone or can be used in an optional combination thereof.

For example, monomers disclosed in JP-A-61-223007 can be used as the perfluoro(alkoxy vinyl ether) ($m^6$).

With respect to the monomer ($n^3$), any of monomers copolymerizable with the monomer ($m^5$) and the monomer ($m^6$) may be used, and preferable are monomers providing a cure site.

Examples of such a monomer as providing a cure site are VdF, iodine- or bromine-containing monomers represented by the general formula (2), monomers represented by the general formula (3), and monomers represented by the general formula (4), and there are, for example, iodine-containing monomers disclosed in JP-B-5-63482 and JP-A-7-316234 such as perfluoro(6,6-dihydro-6-iodo-3-oxa-1-hexene) and perfluoro(5-iodo-3-oxa-1-pentene), iodine-containing monomers disclosed in JP-A-4-217936 such as $CF_2=CFOCF_2CF_2CH_2I$, bromine-containing monomers disclosed in JP-A-4-505341, and the like. Those monomers can be used alone or can be used in an optional combination thereof.

Those iodine atom and bromine atom can function as a cure site.

Examples of such a perfluoro fluorine-containing rubber (b) are fluorine-containing rubbers disclosed in WO97/24381, JP-B-61-57324, JP-B-4-81608, JP-B-5-13961 and the like.

Of these rubbers, fluorine-containing rubbers comprising VdF and at least one other fluorine-containing monomer are preferable, and at least one kind of rubber selected from the group consisting of VdF/HFP type fluorine-containing rubbers, VdF/TFE/HFP type fluorine-containing rubbers and VdF/TFE/PAVE type fluorine-containing rubbers is preferable.

The non-perfluoro fluorine-containing rubber (a) and perfluoro fluorine-containing rubber (b) explained above can be prepared by a usual method, and an iodine transfer polymerization method known as a method of preparing a fluorine-containing rubber is preferable from the point that the obtained polymer has a narrow molecular weight distribution, control of a molecular weight is easy and an iodine atom can be introduced to an end of the polymer. For example, there is a method of carrying out emulsion polymerization or solution polymerization of the above-mentioned ethylenic monomer and as case demands, a monomer providing a cure site in the presence of an iodine compound, preferably a di-iodine compound in an aqueous medium under pressure while stirring in the presence of a radical initiator substantially in the absence of oxygen. Represented examples of the iodine compound to be used are, for instance, compounds represented by the general formula (7):

$$R^2I_xBr_y \qquad (7)$$

wherein "x" and "y" are 0 or integers of 1 to 2, and $1 \leq x+y \leq 2$ is to be satisfied; $R^2$ is a saturated or unsaturated fluoro hydrocarbon group or chlorofluoro hydrocarbon group having 1 to 16 carbon atoms or a hydrocarbon group having 1 to 3 carbon atoms and may contain oxygen atom. To an end of a fluorine-containing rubber obtained using such an iodine compound is introduced an iodine atom or a bromine atom.

Examples of the compound represented by the general formula (7) are, for instance, 1,3-diiodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1,2-bromo-4-iodoperfluorobutene-1, monoiodomonobromo-substituted benzene, diiodo-substituted benzene and (2-iodoethyl)- and (2-bromoethyl)-substituted benzene. These may be used alone or can be used in a combination thereof.

Of these, from the viewpoint of polymerization reactivity, crosslinking reactivity and availability, 1,4-diiodoperfluorobutane, diiodomethane and the like are preferable.

The radical polymerization initiator used in the present invention may be the same as an initiator that has been used for polymerization of a fluorine-containing rubber. Examples of such an initiator are organic and inorganic peroxides and azo compounds. Represented initiators are peroxosulfates, peroxocarbonates and peroxoesters, and a preferable initiator is ammonium peroxosulfate (APS). APS may be used alone or can be used in combination with reducing agents such as sulfites.

The emulsifier used for emulsion polymerization can be selected from a wide range, and from the viewpoint of inhibiting a chain transfer reaction to the emulsifier molecules that occurs during the polymerization, salts of carboxylic acid having a fluorocarbon chain or a fluoropolyether chain are desirable. The amount of the emulsifier is preferably about 0.005 to 2% by weight, particularly preferably 0.01 to 1.5% by weight based on the added water.

Since a monomer mixture gas to be used in the present invention is explosive in some cases as described in Advances in Chemistry Series, 129, 13 (1973) by G. H. Kalb et al., it is necessary that a polymerization equipment is so designed as to cause no sparking becoming an ignition source.

The polymerization pressure can be varied in a wide range and is usually within the range from 0.5 to 7 MPa. The higher the polymerization pressure is, the higher the polymerization rate and therefore, from the viewpoint of improvement in productivity, the polymerization pressure is preferably not less than 0.8 MPa.

An adding amount of the compound represented by the above-mentioned general formula (7) may be optionally varied for the purpose of adjusting a molecular weight of the fluorine-containing rubber, and is from 0.0001 to 15% by weight based on the total amount of the obtained fluorine-containing rubber.

A Mooney viscosity at 100° C. of the fluorine-containing rubber to be used in the present invention is preferably 20 to 150, more preferably 40 to 130. When the Mooney viscosity is less than 20, tackiness is strong, which tends to interfere with a kneading step of a rubber. When more than 150, there is a tendency that flowability at a crosslinking reaction is impaired.

In addition, it is preferable that the fluorine-containing rubber of the present invention has a cure site capable of crosslinking reaction. It is more preferable that the cure site is iodine or bromine from the viewpoint of being capable of peroxide crosslinking.

The crosslinked fluorine-containing silicone rubber particles are not limited particularly as long as a fluorine-containing organic group is bonded to a silicon atom in a siloxane unit constituting the crosslinked particles through a divalent connecting group.

Examples of this fluorine-containing organic group are, for instance, a group represented by the general formula (8):

wherein "n" is an integer of 1 to 5,
a group represented by the general formula (9):

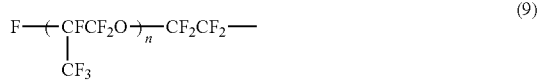

wherein "n" is an integer of 1 to 5,
a group represented by the general formula (10):

wherein "m" is an integer of 1 to 20, preferably an integer of 2 to 10, a group represented by the general formula (11):

wherein "m" is an integer of 1 to 20, preferably an integer of 2 to 10, $R^3$ is an alkyl group, an alkenyl group or an aryl group, a group represented by the general formula (12):

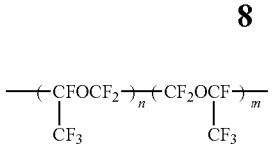

wherein "m" is an integer of 1 to 50, "n" is an integer of 1 to 50, and m+n=2 to 100 is to be satisfied,
a group represented by the general formula (13):

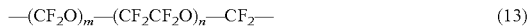

wherein "m" and "n" are integers of 1 to 50, and
a group represented by the general formula (14):

wherein "m" is an integer of 1 to 20, preferably an integer of 2 to 10.

The divalent connecting group for bonding the fluorine-containing organic group to the silicon atom may be an alkylene group, an arylene group, or a combination thereof, or those groups may be bonded through an ether-bonding oxygen atom, an amide bond or a carbonyl bond. Examples thereof are —$CH_2CH_2$—, —$CH_2CH_2CH_2$—, —$CH_2CH_2CH_2OCH_2$—, —$CH_2CH_2CH_2$—NH—CO—, —$CH_2CH_2CH_2$—N(Ph)-CO—, where Ph is a phenyl group, —$CH_2CH_2CH_2$—N($CH_3$)—CO— and —$CH_2CH_2CH_2$—O—CO—.

Examples of the fluorine-containing organic group having such a divalent connecting group are, for instance, —$CH_2CH_2CF_3$, —$CH_2CH_2CF_2CF_3$, —$CH_2CH_2CF_2CF_2CF_3$ and —$CH_2CH_2CF_2CF_2CH=CH_2$, and of these, —$CH_2CH_2CF_3$ is preferable from the viewpoint of easy synthesis.

In addition, examples of other group bonding to the silicon atom in the siloxane unit constituting the crosslinked particles are, for instance, alkyl groups such as methyl, ethyl, propyl, butyl, pentyl, hexyl, cyclohexyl, octyl and decyl; alkenyl groups such as vinyl, allyl, butenyl, pentenyl, hexenyl, heptenyl and octenyl; aryl groups such as phenyl, tolyl, xylyl and naphthyl; aralkyl groups such as benzyl and phenethyl; the above-mentioned groups in which at least a part of hydrogen atoms thereof are replaced by chlorine atoms, cyano groups or the like, for example, un-substituted or substituted hydrocarbon groups such as a chloromethyl group, a chloropropyl group and a cyanoethyl group; alkylene groups such as an ethylene group, a butylene group, a pentylene group and a hexylene group; epoxy-containing organic groups such as a 3-glycidoxypropyl group, a 2-(3,4-epoxycyclohexyl)ethyl group and a 4-oxiranylbutyl group; amino-containing organic groups such as a 2-aminoethyl group, a 3-aminopropyl group and a N-(2-aminoethyl)-3-aminopropyl group; acryl-containing organic groups such as a 3-methacryloxypropyl group and a 3-acryloxypropyl group; alkoxy groups such as methoxy and ethoxy; and hydrogen atom and hydroxyl. Of theses, alkyl groups, aryl groups, alkenyl groups and acryl-containing organic groups are preferable.

An average particle size of the crosslinked particles are not limited particularly, and is preferably not more than 100 μm, more preferably 0.01 to 50 μm, further preferably 0.01 to 20 μm, particularly preferably 0.1 to 10 μm. There is a tendency that the crosslinked particles having an average particle size of less than 0.01 μm are difficult to produce, and when the average particle size of the crosslinked particles exceeds 100 μm, there is a tendency that a mechanical strength of the fluorine-containing rubber containing such particles is decreased.

In addition, a shape of the crosslinked particles is not limited particularly, for example, there are a spherical shape and an irregular shape. The particles are preferably in a spherical shape particularly from the point that the particles can be dispersed uniformly in the fluorine-containing rubber.

For preparing such crosslinked particles, there is a process of dispersing a liquid fluorine-containing silicone rubber composition in water and then curing the composition according to the method disclosed in, for example, JP-A-62-243621 or JP-A-63-202658.

Examples of the liquid fluorine-containing silicone rubber composition used in the above-mentioned preparation process are, for instance, a condensation-reactive composition (hereinafter referred to as composition (I)) comprising organopolysiloxane having, in one molecule thereof, at least two hydroxyl groups bonded to a silicon atom, an organosilicon compound represented by the general formula (15):

$$R^4R^5_a Si(OR^6)_{(3-a)} \quad (15)$$

wherein $R^4$ is a fluorine-containing organic group bonded through a divalent connecting group; $R^5$ is a phenyl group or an alkyl group having four or less carbon atoms; $R^6$ is an alkyl group having four or less carbon atoms; "a" is 0 or 1, or a partly hydrolyzed condensate of the organosilicon compound, a catalyst for the condensation reaction, and a crosslinking agent as case demands, a condensation-reactive composition (hereinafter referred to as composition (II)) comprising organopolysiloxane having, in one molecule thereof, at least one fluorine atom-containing organic group bonded to a silicon atom through a divalent connecting group and at least two hydroxyl groups bonded to a silicon atom, a crosslinking agent, and a catalyst for the condensation reaction, and an addition-reactive composition (hereinafter referred to as composition (III)) comprising organopolysiloxane having, in one molecule thereof, at least two alkenyl groups and a fluorine-containing organic group bonded to the silicon atom through a divalent connecting group, organohydrogenpolysiloxane having, in one molecule thereof, at least two hydrogen atoms bonded to the silicon atom, and a catalyst for addition reaction.

Particularly from the viewpoint of affinity for the fluorine-containing rubber, preferable are crosslinked particles obtained by curing the composition (I) or (II) by condensation reaction.

The compositions (I), (II) and (III) are explained below.

In the composition (I), organopolysiloxane is a main component, and is characterized by having, in one molecule thereof, at least two hydroxyl groups bonded to the silicon atom. A bonding position of this hydroxyl group is not limited, and is preferably an end of a molecular chain from the viewpoint of good reactivity.

Examples of other group to be bonded to the silicon atom are the same un-substituted or substituted hydrocarbons as mentioned above; and alkoxy groups such as methoxy and ethoxy. Of these groups, preferable are methyl and phenyl.

Examples of a molecular structure of the organopolysiloxane are, for instance, a linear chain structure, a cyclic structure, a net-like structure, a linear chain structure partly having a branch and a branched chain structure, and a linear chain structure is preferable.

In addition, a viscosity at 25° C. of the organopolysiloxane is not limited particularly, and practically the viscosity is preferably 5 to 100,000 mPa·s, more preferably 10 to 10,000 mPa·s.

Next, the organosilicon compound represented by the general formula (15) or the partly hydrolyzed condensate thereof is a component for introducing the fluorine-containing organic group in the crosslinked particles by condensation reaction.

In the formula, $R^4$ is the fluorine-containing organic group bonded through the divalent connecting group, and examples thereof are the same as those exemplified above.

In the formula, $R^5$ is phenyl or an alkyl group having four or less carbon atoms. Examples of the alkyl group are, for instance, methyl, ethyl, propyl and butyl, and of these, methyl is preferable.

In the formula, $R^6$ is an alkyl group having four or less carbon atoms, and examples thereof are the same as those exemplified above. Of these, preferable $R^6$ is methyl.

In the formula, "a" is 0 or 1.

An adding amount of the organosilicon compound or the partly hydrolyzed condensate thereof is not limited particularly, and is, for example, preferably 0.1 to 50 parts by weight, more preferably 1 to 40 parts by weight based on 100 parts by weight of organopolysiloxane. When the amount is less than 0.1 part by weight, there is a tendency that affinity of the obtained crosslinked particles for the fluorine-containing rubber is significantly lowered, and when the amount exceeds 50 parts by weight, there is a tendency that a mechanical strength of the obtained crosslinked particles is decreased remarkably.

The catalyst for the condensation reaction is a catalyst for accelerating curing of the composition (I). Examples thereof are, for instance, tin catalysts such as di-n-butyltin diacetate, di-n-butyltin di-2-ethylhexoate, n-butyltin tri-2-ethylhexoate, di-n-butyltin dilaurate, di-n-butyltin dioctoate, tin octylate, tin octenoate, tin laurate, tin naphthenate and tin oleate; organotitanate compounds such as tetra-n-butyl titanate, tetraisopropyl titanate, tetra-2-ethylhexyl titanate and ethylene glycol titanate; titanium catalysts such as diisopropoxybis(acetylacetone) titanium, diisopropoxybis(ethylacetoacetate) titanium, diisopropoxybis(methylacetoacetate) titanium, dimethoxybis(methylacetoacetate) titanium, dibuthoxybis(ethylacetoacetate) titanium and titanium naphthenate; organic acid salt catalysts of metals such as iron stanooctenoate, lead octenoate, lead laurate, zinc octenoate, cobalt naphthenate, iron naphthenate, zinc naphthenate, zinc stearate and iron octenoate; amine catalysts such as n-hexylamine and guanidine; platinum catalysts such as chloroplatinic acid, alcohol solution of chloroplatinic acid, olefin complex of platinum, alkenylsiloxane complex of platinum, platinum black and platinum on silica; and a mixture of two or more of those catalysts for condensation reaction.

An adding amount of the catalyst for condensation reaction is not limited particularly, and is preferably 0.01 to 20 parts by weight, more preferably 0.01 to 10 parts by weight based on 100 parts by weight of organopolysiloxane.

In addition, to the composition (I) may be blended an organosilicon compound represented by the general formula (16):

$$R^7R^5_b Si(OR^6)_{(3-b)} \quad (16)$$

or a partly hydrolyzed condensate thereof in order to introduce an alkenyl group, an epoxy-containing organic group, an amino-containing organic group or an acryl-containing organic group in the obtained crosslinked particles.

In the formula, $R^5$ is phenyl or an alkyl group having four or less carbon atoms, and $R^6$ is an alkyl group having four or less carbon atoms. Examples of the respective groups are the same as those exemplified supra.

In the formula, $R^7$ is a group selected from the group consisting of alkenyl groups, epoxy-containing organic groups, amino-containing organic groups and acryl-containing organic groups. Examples of the alkenyl groups, epoxy-containing organic groups, amino-containing organic groups and acryl-containing organic groups are those exemplified supra as the other group to be bonded to the silicon atom in the siloxane unit constituting the above-mentioned crosslinked particles. Among them, from the viewpoint of having reactivity in the peroxide crosslinking reaction of the fluorine-containing rubber, alkenyl groups and acryl-containing organic groups are preferable, and vinyl, allyl, hexenyl and 3-methacryloxypropyl are more preferable.

In addition, "b" is 0 or 1.

Examples of the organosilicon compound and partly hydrolyzed condensate thereof are, for instance, vinyltrimethoxysilane, vinyltriethoxysilane, vinyltris(2-methoxyethoxy)silane, methylvinyldimethoxysilane, allyltrimethoxysilane, 3-glycidoxypropyltrimethoxysilane, 3-glycidoxypropylmethyldimethoxysilane, 2-(3,4-epoxycyclohexyl)ethyltrimethoxysilane, 3-aminopropyltrimethoxysilane, 3-aminopropylmethyldimethoxysilane, N-(2-aminoethyl)-3-aminopropyltrimethoxysilane, 3-methacryloxypropyltrimethoxysilane, partly hydrolyzed condensates thereof, and a mixture of two or more thereof.

An adding amount of the organosilicon compound or partly hydrolyzed condensate thereof is not limited particularly, and is preferably 0.05 to 50 parts by weight, more preferably 0.05 to 15 parts by weight based on 100 parts by weight of organopolysiloxane. When the amount is less than 0.05 part by weight, there is a tendency that a reactivity of the obtained crosslinked particles with the fluorine-containing rubber cannot be expected, and when the amount exceeds 50 parts by weight, there is a tendency that a mechanical strength of the obtained crosslinked particles is significantly decreased.

To the composition (I) can be blended an optional component for crosslinking organopolysiloxane, for example, alkylpolysilicate and organohydrogenpolysiloxane. Examples of alkylpolysilicate are methylpolysilicate and ethylpolysilicate. Examples of organohydrogenpolysiloxane are methylhydrogenpolysiloxane blocked with trimethylsiloxy groups at both ends of its molecular chain, a dimethylsiloxane methylhydrogensiloxane copolymer blocked with trimethylsiloxy groups at both ends of its molecular chain, methylhydrogenpolysiloxane blocked with dimethylhydrogensiloxy groups at both ends of its molecular chain and a dimethylsiloxane-methylhydrogensiloxane copolymer blocked with dimethylhydrogensiloxy groups at both ends of its molecular chain.

In the composition (I), adding amounts of alkylpolysilicate and organohydrogenpolysiloxane are not limited particularly. For example, the adding amount of alkylpolysilicate is preferably 1 to 100 parts by weight, more preferably 1 to 50 parts by weight based on 100 parts by weight of organopolysiloxane, and the adding amount of organohydrogenpolysiloxane is preferably 1 to 20 parts by weight based on 100 parts by weight of organopolysiloxane.

Then the composition (II) is explained below.

In the composition (II), organopolysiloxane is a main component and is characterized by having, in one molecule thereof, at least one fluorine atom-containing organic group bonded to the silicon atom through a divalent connecting group and at least two hydroxyl groups bonded to the silicon atoms. A bonding position of the hydroxyl groups is not limited, and from the viewpoint of good reactivity, it is preferable that the hydroxyl group is bonded at an end of the molecular chain.

Examples of this fluorine-containing organic group are the same as those exemplified supra. Also examples of the divalent connecting group are the same as those exemplified supra.

Examples of other group bonded to the silicon atom are the same un-substituted or substituted hydrocarbon groups as exemplified supra; alkoxy groups such as methoxy and ethoxy. Of these groups, methyl and phenyl are preferable.

Examples of a molecular structure of the organopolysiloxane are, for instance, a linear chain structure, a cyclic structure, a net-like structure, a linear chain structure partly having a branch and a branched chain structure, and a linear chain structure is especially preferable.

In addition, a viscosity at 25° C. of the organopolysiloxane is not limited particularly, and practically the viscosity is preferably 5 to 100,000 mPa·s, more preferably 10 to 10,000 mPa·s.

Next, in the composition (II), examples of the crosslinking agent are the organosilicon compound represented by the above-mentioned general formula (15) or the partly hydrolyzed condensate thereof, the organosilicon compound represented by the above-mentioned general formula (16) or the partly hydrolyzed condensate thereof, alkylpolysilicate and organohydrogenpolysiloxane.

The organosilicon compound represented by the general formula (15) or the partly hydrolyzed condensate thereof is a component for further introducing the fluorine-containing organic group to the crosslinked particles by condensation reaction. Examples thereof are the same as exemplified supra.

An adding amount of this organosilicon compound or the partly hydrolyzed condensate thereof is not limited particularly, and is, for example, preferably 0.1 to 50 parts by weight, more preferably 1 to 40 parts by weight based on 100 parts by weight of organopolysiloxane. When the amount is less than 0.1 part by weight, there is a tendency that affinity of the obtained crosslinked particles for the fluorine-containing rubber is significantly lowered, and when the amount exceeds 50 parts by weight, there is a tendency that a mechanical strength of the obtained crosslinked particles is decreased remarkably.

The organosilicon compound represented by the above-mentioned general formula (16) or the partly hydrolyzed condensate thereof is a component for introducing an alkenyl group, an epoxy-containing organic group, an amino-containing organic group or an acryl-containing organic group to the crosslinked particles by condensation reaction. Examples thereof are the same as exemplified supra.

An adding amount of this organosilicon compound or the partly hydrolyzed condensate thereof is not limited particularly, and is, for example, preferably 0.05 to 50 parts by weight, more preferably 0.05 to 15 parts by weight based on 100 parts by weight of organopolysiloxane. When the amount is less than 0.05 part by weight, there is a tendency that reactivity of the obtained crosslinked particles with the fluorine-containing rubber cannot be expected, and when the amount exceeds 50 parts by weight, there is a tendency that a mechanical strength of the obtained crosslinked particles is decreased remarkably.

Examples of the alkylpolysilicate are the same as those exemplified supra. A blending amount thereof is not limited particularly, and is preferably 1 to 100 parts by weight, more preferably 1 to 50 parts by weight based on 100 parts by weight of organopolysiloxane.

Examples of the organohydrogenpolysiloxane are the same as those exemplified supra. A blending amount thereof is not limited particularly, and is preferably 1 to 20 parts by weight based on 100 parts by weight of organopolysiloxane.

The catalyst for the condensation reaction is a catalyst for accelerating the curing of the composition (II), and examples thereof are the same catalysts as those exemplified supra.

A blending amount of this catalyst for the condensation reaction is not limited particularly, and is preferably 0.01 to 20 parts by weight, more preferably 0.01 to 10 parts by weight based on 100 parts by weight of organopolysiloxane.

Next, the composition (III) is explained below.

In the composition (III), organopolysiloxane is a main component and is characterized by having, in one molecule thereof, at least two alkenyl groups and a fluorine-containing organic group bonded to the silicon atom through a divalent connecting group.

Examples of the alkenyl group are, for instance, vinyl, allyl, butenyl, pentenyl and hexenyl, and vinyl is preferable.

Examples of the fluorine-containing organic group bonded to the silicon atom through a divalent connecting group are the same groups as those exemplified supra.

In addition, examples of other group bonded to the silicon atom are an un-substituted or substituted hydrocarbon group, an epoxy-containing organic group, an amino-containing organic group and an acryl-containing organic group. Examples of these groups are those exemplified as the above-mentioned other groups bonded to the silicon atom in the siloxane unit constituting the crosslinked particles. Of these groups, methyl and phenyl are preferable.

Examples of a molecular structure of the organopolysiloxane are, for instance, a linear chain structure, a cyclic structure, a net-like structure, a linear chain structure partly having a branch and a branched chain structure, and a linear chain structure is preferable.

A viscosity at 25° C. of the organopolysiloxane is not limited particularly, and practically the viscosity is preferably 5 to 100,000 mPa·s, more preferably 20 to 10,000 mPa·s.

The organohydrogenpolysiloxane is a crosslinking agent, and is characterized by having, in one molecule thereof, at least two hydrogen atoms bonded to the silicon atom. In addition, examples of other group bonded to the silicon atom are the same un-substituted or substituted hydrocarbon groups as mentioned supra, and of these groups, methyl and phenyl are preferable.

Examples of a molecular structure of organohydrogenpolysiloxane are, for instance, a linear chain structure, a cyclic structure, a net-like structure, a linear chain structure partly having a branch and a branched chain structure, and a linear chain structure is preferable.

A viscosity at 25° C. of the organohydrogenpolysiloxane is not limited particularly, and practically the viscosity is preferably 1 to 10,000 mPa·s, more preferably 1 to 1,000 mPa·s.

A blending amount of this organohydrogenpolysiloxane is not limited particularly, and is preferably 0.05 to 50 parts by weight, more preferably 0.05 to 15 parts by weight based on 100 parts by weight of organopolysiloxane. When the amount is less than 0.05 part by weight, there is a tendency that it is difficult to obtain crosslinked particles, and when the amount exceeds 50 parts by weight, there is a tendency that a mechanical strength of the obtained crosslinked particles is decreased remarkably.

The catalyst for the addition reaction is a catalyst for accelerating the curing of the composition (III), and examples thereof are, for instance, platinum catalysts such as chloroplatinic acid, alcohol solution of chloroplatinic acid, olefin complex of platinum, alkenylsiloxane complex of platinum, platinum black and platinum on silica.

A blending amount of this catalyst for the addition reaction is not limited particularly, and the amount converted in terms of a weight of catalytic metal in the catalyst is preferably 0.01 to 500 ppm, more preferably 0.1 to 100 ppm, based on weight of organopolysiloxane.

The crosslinked fluorine-containing silicone rubber particles used in the present invention can be obtained by dispersing the liquid fluorine-containing silicone rubber composition in water and curing it. In order to form a stable particle by dispersing the composition in water, it is preferable to use a surfactant.

Examples of the surfactant are, for instance, nonionic surfactants such as polyoxyalkylene alkyl ether, polyoxyalkylene alkyl phenol ether, polyoxyalkylene alkyl ester, polyoxyalkylene sorbitan ester, polyethylene glycol, polypropylene glycol and ethylene oxide-added diethylene glycol trimethylnonanol; anionic surfactants such as hexylbenzenesulfonic acid, octylbenzenesulfonic acid, decylbenzenesulfonic acid, dodecylbenzenesulfonic acid, cetylbenzenesulfonic acid, myristylbenzenesulfonic acid and sodium salts thereof; cationic surfactants such as octyltrimethylammonium hydroxide, dodecyltrimethylammonium hydroxide, hexadecyltrimethylammonium hydroxide, octyldimethylbenzylammonium hydroxide, decyldimethylbenzylammonium hydroxide, dioctadecyldimethylammonium hydroxide and coconut oil trimethylammonium hydroxide; and a mixture of two or more kinds of these surfactants.

In addition, in order to form crosslinked particles having smaller average particle size by dispersing the liquid fluorine-containing silicone rubber composition in water, there can be used, for example, a known emulsifier such as a colloid mill, a homogenizer, a propeller type stirrer, COMBI MIX or an ultrasonic stirrer.

Then, for forming crosslinked fluorine-containing silicone rubber particles by curing the particle of liquid fluorine-containing silicone rubber composition being dispersed in water, there is a method of allowing this water dispersion under room temperature or a method of heating the water dispersion. For these methods, usual conditions can be adopted.

In addition, it is preferable to blend the water dispersion of crosslinked fluorine-containing silicone rubber particles to water dispersion of fluorine-containing rubber, and in order to blend the crosslinked particles to the fluorine-containing rubber, the crosslinked particles may be separated from the water dispersion.

For separating the crosslinked particles from the water dispersion, there are, for example, a method of drying in an oven, a method of drying with cold air, warm air or hot air, a method of drying under reduced pressure, and further a method of drying by any of the above-mentioned methods after adding an evaporative organic solvent such as alcohol and then replacing water with the solvent. In these methods, usual conditions therefor can be employed.

The content of fluorine atoms in the whole of crosslinked fluorine-containing silicone rubber particles is preferably 2 to 60% by weight, more preferably 5 to 40% by weight, further preferably 20 to 40% by weight. When the content of fluorine atoms is less than 2% by weight, since compatibility of the crosslinked fluorine-containing silicone rubber particles with the fluorine-containing rubber is insufficient, the crosslinked silicone particles cannot be dispersed uniformly in the fluorine-containing rubber and satisfactory fuel impermeability cannot be obtained.

Also from the viewpoint of affinity for the fluorine-containing rubber, a modified type of fluorine-containing silicone rubber particles in which a small amount of fluoroalkyl groups are introduced can be suitably used.

In addition, in the present invention, when the crosslinked silicone particles are modified with fluorine atoms, from the point that fuel impermeability can be enhanced more, it is preferable that not only the surface of particles but also the inside of particles (bulk portion) are modified with fluorine atoms.

The mixing ratio of the crosslinked fluorine-containing silicone rubber particles to the fluorine-containing rubber is preferably 80/20 to 5/95, more preferably 55/45 to 20/80 in a weight ratio in consideration of cold resistance and fuel impermeability. When the proportion of the fluorine-containing rubber is less than 20, the fluorine-containing rubber is not a matrix phase any more, and fuel impermeability and mechanical characteristics tend to be lowered extremely. When the proportion of the fluorine-containing rubber exceeds 95, there is a tendency that a marked enhancement of cold resistance cannot be recognized.

The composite material of the present invention may be crosslinked or may not be crosslinked.

In the composite material of the present invention, from the point that excellent fuel impermeability can be realized, it is preferable that the fluorine-containing rubber forms a continuous phase and the crosslinked fluorine-containing silicone rubber particles form a dispersion phase.

In addition, the composite material of the present invention may contain a co-continuous structure of the fluorine-containing rubber and the crosslinked fluorine-containing silicone rubber particles partly in the preferred embodiment of the structure of the composite material comprising the continuous phase of the fluorine-containing rubber and the dispersion phase of the crosslinked fluorine-containing silicone rubber particles.

It is preferable that the composite material of the present invention is prepared by a preparation process comprising a step of co-coagulating an emulsion of fluorine-containing rubber and an emulsion of crosslinked fluorine-containing silicone rubber because a uniform dispersion can be easily formed. By carrying out the co-coagulation, strength and fuel impermeability become satisfactory.

A coagulating agent is not limited particularly as long as it is a usual one. Examples thereof are, for instance, sulfuric acid, hydrochloric acid, nitric acid, aluminum sulfate, aluminum chloride, magnesium chloride, calcium chloride, sodium nitrate, potash alum and the like. Of these, nitric acid, aluminum sulfate, magnesium chloride, potash alum and the like are preferable.

An amount of a coagulating agent is preferably 0.2 to 3 parts by weight, more preferably 0.5 to 2 parts by weight based on 100 parts by weight of the total solid content of the fluorine-containing rubber and fluorine-containing silicone rubber obtained by the polymerization. When the amount of a coagulating agent is less than 0.2 part by weight, there is a tendency that since a sufficient coagulation effect cannot be obtained, a co-coagulated product comprising the fluorine-containing rubber and fluorine-containing silicone rubber cannot be obtained efficiently. When the amount of a coagulating agent exceeds 3 parts by weight, there is a tendency that even if a cleaning step is carried out, a large amount of coagulating agent remains in the co-coagulated product comprising the fluorine-containing rubber and fluorine-containing silicone rubber.

The coagulating equipment is not limited particularly, and usual coagulating equipment may be used.

The composite material of the present invention may be one obtained by crosslinking a composition prepared by adding a crosslinking agent and as case demands, a crosslinking accelerator to the co-coagulated product which comprises the fluorine-containing rubber and fluorine-containing silicone rubber and is obtained by the co-coagulation.

Examples of a crosslinking agent to be used for crosslinking the fluorine-containing rubber are those usually used in peroxide crosslinking, polyamine type crosslinking and polyol type crosslinking.

Examples of a crosslinking agent used in peroxide crosslinking are generally those which generate peroxy radicals easily in the presence of heat or an oxidation or reducing system. Specific examples thereof are 1,1-bis(t-butylperoxy)-3,5,5-trimethylcyclohexane, 2,5-dimethylhexane-2,5-dihydroperoxide, di-t-butyl peroxide, t-butylcumyl peroxide, dicumyl peroxide, α,α'-bis(t-butylperoxy)-p-diisopropylbenzene, 2,5-dimethyl-2,5-bis(t-butylperoxy)hexane, 2,5-dimethyl-2,5-bis(t-butylperoxy)hexyne-3, benzoyl peroxide, t-butyl peroxybenzene, 2,5-dimethyl-2,5-di(benzoylperoxy)hexane, t-butylperoxy maleic acid, t-butylperoxy isopropylcarbonate and the like. Of these, preferable are those of dialkyl type. Kind and an amount of peroxide are generally selected in consideration of an amount of active —O—O—, a decomposition temperature, etc.

In addition, a crosslinking accelerator can be used as case demands. Examples of the crosslinking accelerator are triallyl cyanurate, triallyl isocyanurate (TAIC), triacryl formal, triallyl trimellitate, N,N'-m-phenylenebismaleimide, dipropargyl terephthalate, diallyl phthalate, tetraallyl terephthalamide, triallyl phosphate and the like. Of these, from the viewpoint of crosslinkability and physical properties of a crosslinked product, triallyl isocyanurate (TAIC) is preferable.

Examples of polyamine type crosslinking agent are primary amines and secondary amines in which two or more basic nitrogen atoms are bonded in its molecule, and in many cases, those crosslinking agents are used in the form of a salt, thus inhibiting reactivity. Examples thereof are, for instance, alkylene diamines such as ethylenediamine carbamate, hexamethylenediamine carbamate and 4,4-diaminecyclohexylmethane carbamate; Schiff bases such as N,N'-dicinnamylidene-1,6-hexamethylenediamine; and the like. In addition, aromatic polyamine compounds being poor in basicity can be used as a crosslinking agent by combination use with other basic compound. Examples of other basic compound are, for instance, diphenylguanidine, di-O-triguanidine, diphenyl thiourea, 2-mercaptoimidazoline, compounds which are vulcanization accelerators for synthetic rubbers and have —NH$_3$ and/or —NH— in a molecule thereof, divalent metal hydroxides and the like.

Examples of polyol type crosslinking agent are polyhydroxy compounds. Examples of suitable polyhydroxy compounds are polyhydroxy compounds having a phenolic hydroxyl group or

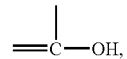

dihydroxy compounds represented by the general formula (17):

wherein $R_f^3$ is a perchlorofluoroalkylene group or polyfluoroalkylene group having 1 to 20 carbon atoms, alkali metal salts thereof and a mixture thereof.

Examples thereof are, for instance, hydroquinone, 2,2-bis(4-hydroxyphenyl)propane, 2,2-bis(4-hydroxyphenyl)perfluoropropane, 2,2-bis(4-hydroxyphenyl)butane, 1,1-bis(4-hydroxyphenyl)methane, 4,4'-dihydroxyphenyl ether, HOCH$_2$(CF$_2$)$_3$CH$_2$OH, HOCH$_2$CF$_2$CFH(CF$_2$)$_3$CFHCF$_2$CH$_2$OH, HOCH$_2$CH$_2$CH$_2$(CF$_2$)$_3$CH$_2$CH$_2$CH$_2$OH, HOCH$_2$CF$_2$CH$_2$(CF$_2$)$_3$CH$_2$CF$_2$CH$_2$OH, alkali metal salts thereof and the like.

Also among these crosslinking agents, those of different crosslinking systems may be used together.

In addition, tertiary amines, tri-substituted amidines, penta-substituted guanidines or organic or inorganic acid salts of these compounds, quaternary ammonium salts, quaternary phosphonium salts or nitrogen-containing cyclic polyether can be used, as case demands, as a crosslinking agent or a crosslinking accelerator. Specifically those disclosed in JP-A-51-56854, JP-A-47-1387, JP-A-47-191 and JP-A-53-132858 can be used.

An amount of the crosslinking agent is preferably 0.05 to 10 parts by weight, more preferably 1.0 to 5 parts by weight based on 100 parts by weight of the total solid content of the fluorine-containing rubber and crosslinked fluorine-containing silicone rubber particles. When the amount of crosslinking agent is less than 0.05 part by weight, there is a tendency that crosslinking of the fluorine-containing rubber does not proceed sufficiently and fuel impermeability of the obtained composite material is lowered. When the amount of crosslinking agent exceeds 10 parts by weight, there is a tendency that a hardness of the obtained composite material becomes too high.

An amount of the crosslinking accelerator is preferably 0.1 to 10 parts by weight, more preferably 0.5 to 5 parts by weight based on 100 parts by weight of the fluorine-containing rubber. When the amount of crosslinking accelerator is less than 0.1 part by weight, there is a tendency that crosslinking of the fluorine-containing rubber does not proceed sufficiently and fuel impermeability of the obtained composite material is lowered. When the amount of crosslinking accelerator exceeds 10 parts by weight, mold-processability tends to be lowered.

Together with the crosslinking agent and the crosslinking accelerator, as case demands, usual additives, for example, a filler, a processing aid, a plasticizer, a coloring agent, an antioxidant, an antiaging agent, an antiozonant and an ultraviolet absorber can be blended to the composition, and in addition, one or more kinds of usual crosslinking agent and crosslinking accelerator other than those mentioned above may be blended. The composition can be prepared by mixing each component with a usual processing machine for an elastomer, for example, an open roll, banbury mixer, kneader or the like. The thus obtained composition for crosslinking is crosslinked and molded by a usual method. Namely, the composition is molded by compression molding, injection molding, extrusion molding, calendar molding, dip molding by dissolving in a solvent, coating or the like.

The crosslinking conditions vary depending on a molding method and a shape of a molded article, and the crosslinking is generally carried out at 100° C. to 300° C. for several seconds to five hours. Also secondary crosslinking may be carried out in order to stabilize physical properties of a crosslinked article. The conditions of secondary crosslinking are 150° C. to 300° C. and 30 minutes to 48 hours.

Cold resistance of the composite material of the present invention is preferably not more than −30° C., further preferably not more than −35° C., more preferably −35° C. to −45° C. When cold resistance exceeds −30° C., the composite material cannot be used as a sealing material for automobiles.

Herein cold resistance means a temperature where a test piece frozen at low temperature after stretching recovers elasticity as increase in temperature and shows a constant shrinkage percentage. Examples of the measuring method are a method of low temperature elasticity recovery test (TR test) specified in JIS K6261, etc.

In addition, fuel impermeability of the composite material of the present invention is preferably not more than 500 g·mm/m²·day, more preferably 400 to 100 g·mm/m²·day, further preferably 300 to 100 g·mm/m²·day. When the fuel impermeability exceeds 500 g·mm/m²·day, it cannot satisfy environmental regulations and there is a tendency that it is difficult to use the composite material as a fuel sealing material.

The composite material of the present invention and fuel impermeable sealing material produced from the composite material are preferably those in a crosslinked state and are used as sealing materials used in a fuel system of automobile such as an injector O-ring, fuel tube connector O-ring, air intake manifold gasket, tank cap seal, fuel sender seal and fuel pump seal, and are particularly suitable as peripheral parts of a fuel system and as a fuel container.

EXAMPLES

The present invention is then explained by means of examples, but is not limited to them. Various tests for determining elastic physical properties of the obtained crosslinked molded article are carried out by the following methods.
(Tensile Test)

A tensile stress at break ($TS_b$) and an elongation at break ($E_b$) are measured according to JIS K6251. In the measurement, a test piece in the form of dumbbell No. 4 is used.
(Cold Resistance)

Cold resistance is evaluated by a low temperature elasticity recovery test (TR test) according to JIS K6251, and is indicated by a temperature (TR10) where a shrinkage percentage is 10%.
(Fuel Permeability)

Fuel permeability is determined by a weight measurement using a permeation cup in reference to ASTM E96. CE10 (45% by volume of isooctane, 45% by volume of toluene and 10% by volume of ethanol) is used as a fuel oil, and a permeation rate in g·mm/m²·day at 40° C. is measured.
(Processability by Roll)

Formation of a rubber band is evaluated by the following criteria.

⊚: A rubber band is formed especially satisfactorily.
○: A rubber band is formed satisfactorily.
Δ: A rubber band is somewhat difficult to form.
X: A rubber band is difficult to form.
(Fluorine-Containing Silicone Rubber)

Preparation Example 1

A liquid condensation-reactive fluorine-containing silicone rubber composition was prepared by uniformly mixing 67.5 parts by weight of dimethylpolysiloxane which had a viscosity at 25° C. of 40 mPa·s and was blocked with dimethylhydroxyl groups at both ends of its molecular chain, 7.5 parts by weight of ethylpolysilicate (SILICATE 40 available from Tama Chemicals Co., Ltd.), 20 parts by weight of 3,3,3-trifluoropropyltrimethoxysilane and 5 parts by weight of vinyltrimethoxysilane.

Next, this composition was emulsified in an aqueous solution comprising 1 part by weight of polyoxyethylene lauryl ether and 30 parts by weight of pure water and further emulsified uniformly with a colloid mill, and then thereto was added 158 parts by weight of pure water for dilution to prepare an emulsion of liquid fluorine-containing silicone rubber composition.

Then, to this emulsion was mixed a catalyst for condensation reaction prepared by dispersing 1 part by weight of tin octylate in an aqueous solution comprising 1 part by weight of polyoxyethylene lauryl ether and 9 parts by weight of pure water, followed by allowing to stand one day at room temperature to obtain a homogeneous aqueous suspension of crosslinked fluorine-containing silicone rubber particles.

Water of this aqueous suspension was removed with a hot air dryer of 300° C. to obtain crosslinked fluorine-containing silicone rubber particles (B-1). Characteristics of these crosslinked particles are shown in Table 1.

Preparation Example 2

A liquid condensation-reactive fluorine-containing silicone rubber composition was prepared by uniformly mixing 77.3 parts by weight of dimethylpolysiloxane which had a viscosity at 25° C. of 40 mPa·s and was blocked with dimethylhydroxyl groups at both ends of its molecular chain, 8.1 parts by weight of methylhydrogenpolysiloxane which had a viscosity at 25° C. of 20 mPa·s and was blocked with trimethylsiloxy groups at both ends of its molecular chain, 10 parts by weight of 3,3,3-trifluoropropyltrimethoxysilane and 4.6 parts by weight of 3-glycidoxypropyltrimethoxysilane.

Next, this composition was emulsified in an aqueous solution comprising 5 parts by weight of polyoxyethylene lauryl ether and 30 parts by weight of pure water and further emulsified uniformly with a colloid mill, and then thereto was added 158 parts by weight of pure water for dilution to prepare an emulsion of liquid silicone rubber composition.

Then, to this emulsion was mixed a catalyst for condensation reaction prepared by dispersing 1 part by weight of tin octylate in an aqueous solution comprising 1 part by weight of polyoxyethylene lauryl ether and 9 parts by weight of pure water, followed by allowing to stand one day at room temperature and removing water with a hot air dryer of 300° C. to obtain a silicone rubber powder (B-2). Characteristics of these crosslinked particles are shown in Table 1.

Preparation Example 3

A liquid condensation-reactive silicone rubber composition was prepared by uniformly mixing 86.4 parts by weight of dimethylpolysiloxane which had a viscosity at 25° C. of 40 mPa·s and was blocked with dimethylhydroxyl groups at both ends of its molecular chain, 9.1 parts by weight of methylhydrogenpolysiloxane which had a viscosity at 25° C. of 20 mPa·s and was blocked with trimethylsiloxy groups at both ends of its molecular chain and 4.6 parts by weight of 3-glycidoxypropyltrimethoxysilane.

Next, this composition was emulsified in an aqueous solution comprising 5 parts by weight of polyoxyethylene lauryl ether and 30 parts by weight of pure water and further emulsified uniformly with a colloid mill, and then thereto was added 158 parts by weight of pure water for dilution to prepare an emulsion of liquid silicone rubber composition.

Then, to this emulsion was mixed a catalyst for condensation reaction prepared by dispersing 1 part by weight of tin octylate in an aqueous solution comprising 1 part by weight of polyoxyethylene lauryl ether and 9 parts by weight of pure water, followed by allowing to stand one day at room temperature and removing water with a hot air dryer of 300° C. to obtain a silicone rubber powder (B-3). Characteristics of these crosslinked particles are shown in Table 1.

Preparation Example 4

98.8 parts by weight of trifluoropropylmethylpolysiloxane which was represented by an average formula: $CH_2=CH(CH_3)_2SiO[CH_3(CF_3CH_2CH_2)SiO]_mSi(CH_3)_2CH=CH_2$, where "m" is a value giving a viscosity of 42,000 mPa·s and 1.2 parts by weight of trifluoropropylsilsesquioxane having a viscosity of 6.6 mPa·s and blocked with dimethylhydrogensilyl groups at both ends of its molecular chain were mixed uniformly to prepare an addition-reactive liquid fluorine-containing silicone rubber composition. Then this composition was emulsified in an aqueous solution comprising 1 part by weight of sodium lauryl sulfate and 7 parts by weight of pure water, and after emulsification treatment was further carried out for 30 minutes under 5,000 rpm with a 300 cc COMBI MIX, thereto was added 92 parts by weight of pure water for dilution to obtain an emulsion of liquid fluorine-containing silicone rubber composition. Then, to this emulsion was mixed an aqueous emulsion of platinum catalyst (average particle size of platinum catalyst: 0.05 μm, platinum metal concentration: 0.05% by weight) which had been prepared beforehand using 1,3-divinyl-1,1,3,3-tetramethyldisiloxane as a solvent and contained, as a main component, 1,3-divinyl-1,1,3,3-tetramethyldisiloxane complex of platinum, so that an amount in a weight unit of platinum metal became 10 ppm to the total amount of oil component in the emulsion. Thereafter this emulsion was allowed to stand at 35° C. for 24 hours, thereby crosslinking the composition emulsified in water by hydrosilylation reaction to prepare a suspension of crosslinked particles (B-4). Characteristics of these crosslinked particles are shown in Table 1.

TABLE 1

| | B-1 | B-2 | B-3 | B-4 |
|---|---|---|---|---|
| Shape | Spherical | Spherical | Spherical | Spherical |
| Average particle size (μm) | 2 | 2 | 2 | 4.5 |
| Fluorine atom content (% by weight) | 6.4 | 2.9 | 0 | 36.4 |

(Fluorine-Containing Rubber)

Preparation Example 5

Into a 3-liter autoclave made of SUS316 were poured 1.0 liter of pure water, 2.0 g of $C_7F_{15}COONH_4$ as an emulsifying agent and 0.09 g of disodium hydrogen phosphate.$12H_2O$ as a pH regulator, and the inside of the system was sufficiently replaced with nitrogen gas. Then the autoclave was heated to 80° C. with stirring at 600 rpm, and a monomer mixture of VdF/TFE/PMVE (molar ratio of 70/5/25) was introduced under pressure so that the inside pressure became 1.57 MPa. Subsequently 4 ml of aqueous solution of 5 mg/ml ammonium peroxosulfate (hereinafter referred to as APS) was introduced with pressurized nitrogen gas to initiate a reaction.

As the polymerization reaction proceeded, the inside pressure decreased. Therefore when the inside pressure decreased to 1.47 MPa, 1.2 g of a diiodine compound $I(CF_2)_4I$ was introduced under pressure. Then the inside pressure was increased again to 1.57 MPa with a monomer mixture of VdF/TFE/PMVE (molar ratio of 75/7/18). The inside pressure was increased and decreased repeatedly and 2 ml of the above-mentioned aqueous solution of APS was introduced with pressurized nitrogen gas every three hours to continue the reaction.

After the initiation of the polymerization reaction, when the total pressure decrease reached 2.55 MPa (five hours after), 1.8 g of iodine-containing fluorinated vinyl ether $ICH_2CF_2CF_2OCF=CF_2$ (hereinafter referred to as IM) was introduced under pressure. Similarly when the total of pressure decrease reached 5.10 MPa (five hours after), the autoclave was cooled and the un-reacted monomer was released to obtain an aqueous emulsion having a solid concentration of 29.9% by weight.

To this aqueous emulsion was added an aqueous solution of 5% by weight of potash alum for coagulation. The obtained coagulate was washed with water and then dried to obtain 400 g of a rubber-like polymer (A-1). A Mooney viscosity (ML1+

10 (100° C.)) of this polymer was 73. As a result of $^{19}$F-NMR analysis, this polymer was found to comprise 73.9% by mole of VdF, 7.0% by mole of TFE, 19.0% by mole of PMVE and 0.1% by mole of IM.

Preparation Example 6

Into a 3-liter autoclave made of SUS316 were poured 1.0 liter of pure water and 2.0 g of $C_7F_{15}COONH_4$ as an emulsifying agent, and the inside of the system was sufficiently replaced with nitrogen gas. Then a monomer mixture of VdF/hexafluoropropylene (hereinafter referred to as HFP)/TFE (molar ratio of 18/71/11) was introduced at 80° C. under pressure so that the inside pressure became 1.57 MPa. Subsequently 10 ml of aqueous solution of 2 mg/ml APS was introduced under pressure to initiate a reaction.

As the polymerization reaction proceeded, the inside pressure decreased. Therefore when the inside pressure decreased to 1.47 MPa, 1.2 g of $I(CF_2)_4I$ as a molecular weight regulator was introduced under pressure, and further when the inside pressure decreased to 1.37 MPa, it was increased again to 1.57 MPa with a monomer mixture of VdF/HFP/TFE (molar ratio of 50/30/20). The inside pressure was increased and decreased repeatedly and 10 ml of the above-mentioned aqueous solution of APS was introduced with pressurized nitrogen gas every three hours to continue the reaction.

After the initiation of the polymerization reaction, when the total pressure decrease reached 4.21 MPa (19 hours after), the autoclave was cooled and the un-reacted monomer was released to obtain an aqueous emulsion having a solid concentration of 26.7% by weight.

To this aqueous emulsion was added an aqueous solution of 5% by weight of potash alum for coagulation. The obtained coagulate was washed with water and then dried to obtain 394 g of a rubber-like polymer (A-2). A Mooney viscosity (ML1+10 (100° C.)) of this polymer was 83, and an ultimate viscosity (η) (dl/g, solvent: tetrahydrofuran, 35° C.) was 0.53. As a result of $^{19}$F-NMR analysis, this polymer was found to comprise 50.0% by mole of VdF, 30.0% by mole of HFP and 20.0% by mole of TFE.

Example 1

Kneading of 70 parts by weight of the fluorine-containing rubber (A-1) obtained in Preparation Example 5, 30 parts by weight of fluorine-containing silicone rubber fine particles (B-2) obtained in Preparation Example 2, 3 parts by weight of triallyl isocyanurate (TAIC available from Nippon Kasei Chemical Co., Ltd.) and 1 part by weight of 2,5-dimethyl-2,5-di(t-butylperoxy)hexane (PERHEXA25B available from NOF Corporation) was carried out using two rolls. Then, the obtained compound was subjected to press-crosslinking at 160° C. for ten minutes and further crosslinking in an oven at 180° C. for four hours under evacuation to obtain a crosslinked molded article. Various tests for determining elastic physical properties were carried out using this crosslinked molded article. The results of the tests are shown in Table 2.

Example 2

Kneading, crosslinking for molding and testing for determining physical properties of rubber were carried out in the same manner as in Example 1 except that the fluorine-containing silicone rubber fine particles (B-1) obtained in Preparation Example 1 were used instead of the fluorine-containing silicone rubber fine particles (B-2) obtained in Preparation Example 2. The results of the tests are shown in Table 2.

Example 3

To 102.5 g (weight of solid: 64.6 g) of the silicone rubber emulsion (aqueous suspension) obtained in Preparation Example 1 was added 504 g (weight of solid: 150.7 g) of the fluorine-containing rubber emulsion obtained in Preparation Example 5 to obtain an emulsion mixture. A pH value of this emulsion mixture was 3. This emulsion mixture was added dropwise in 3,000 g of an aqueous solution of 0.04% by weight of aluminum sulfate with stirring at a rate of 50 ml/min to carry out co-coagulation. The precipitated rubber was washed three times with 3,000 g of ionized water, and then dried at 120° C. for 24 hours to obtain 210 g of a rubber composition (yield: 97.6%).

Kneading, crosslinking for molding and testing for determining physical properties of rubber were carried out in the same manner as in Example 1 using 100 parts by weight of a mixture of fluorine-containing rubber and crosslinked fluorine-containing silicone rubber fine particles (mixing ratio: 70/30% by weight) obtained by the co-coagulation. The results of the tests are shown in Table 2.

Example 4

Kneading, crosslinking for molding and testing for determining physical properties of rubber were carried out in the same manner as in Example 1 except that the fluorine-containing rubber (A-2) obtained in Preparation Example 6 was used instead of the fluorine-containing rubber (A-1) obtained in Preparation Example 5, and the fluorine-containing silicone rubber fine particles (B-1) obtained in Preparation Example 1 were used instead of the fluorine-containing silicone rubber fine particles (B-2) obtained in Preparation Example 2. The results of the tests are shown in Table 2.

Example 5

To 167.9 g (weight of solid content: 80.8 g) of the silicone rubber emulsion obtained in Preparation Example 4 was added 611.0 g (weight of solid content: 169.2 g) of the fluorine-containing rubber emulsion obtained in Preparation Example 5 to obtain an emulsion mixture. This emulsion mixture was added dropwise to 1,400 g of an aqueous solution of 0.2% by weight of aluminum sulfate with stirring to carry out co-coagulation. The precipitated rubber was washed three times with 3,000 g of ionized water and dried at 120° C. for 24 hours to obtain 248 g of a rubber composition (yield: 99%).

100 Parts by weight of the mixture comprising the fluorine-containing rubber and the crosslinked fluorine-containing silicone rubber fine particles (mixing ratio of 68/32 in % by weight) obtained by co-coagulation was subjected to kneading and crosslinking for molding in the same manner as in Example 1, and tests for determining physical properties of rubber were carried out. The results of the tests are shown in Table 2.

Comparative Example 1

Kneading, crosslinking for molding and testing for determining physical properties of rubber were carried out in the same manner as in Example 1 except that the silicone rubber fine particles (B-3) obtained in Preparation Example 3 were used instead of the fluorine-containing silicone rubber fine particles (B-2) obtained in Preparation Example 2. The results of the tests are shown in Table 2.

In the following Table 2, "roll" indicates that the kneading is carried out using only a roll, and "co-coagulation" indicates that a crosslinking agent is blended to the coagulated mixture of fluorine-containing rubber and fluorine-containing silicone rubber by kneading with a roll.

TABLE 2

|  | Example | | | | | Comparative Example |
|---|---|---|---|---|---|---|
|  | 1 | 2 | 3 | 4 | 5 | 1 |
| Fluorine-containing rubber | A-1 | A-1 | A-1 | A-2 | A-1 | A-1 |
| Silicone rubber | B-2 | B-1 | B-1 | B-1 | B-4 | B-3 |
| Blending method | roll | roll | co-coagulation | roll | co-coagulation | roll |
| Roll processability | ◯ | ◯ | ◎ | Δ | ◎ | ◯ |
| Tensile stress $TS_b$ (MPa) | 13.2 | 6.3 | 8.9 | 7.5 | 6.3 | 13.5 |
| Tensile elongation $E_b$ (%) | 181 | 315 | 237 | 319 | 370 | 190 |
| Cold resistance TR10 (° C.) | −35 | −35 | −35 | −11 | −37 | −35 |
| Fuel permeability (g·mm/m²·day) | 680 | 420 | 360 | 50 | 320 | 770 |

INDUSTRIAL APPLICABILITY

The present invention can provide a novel fluorine-containing composite material having excellent fuel impermeability and excellent cold resistance by dispersing crosslinked fluorine-containing silicone rubber particles in a fluorine-containing rubber.

The invention claimed is:

1. A fluorine-containing composite material in which crosslinked fluorine-containing silicone rubber particles are dispersed in a fluorine-containing rubber, wherein said crosslinked fluorine-containing silicone rubber particles comprise 2 to 60% by weight fluorine atoms and have a particle size of from 0.1 to 10 μm; and wherein the fluorine-containing rubber comprises a vinylidene floride/tetrafluoroethylene/perfluoro vinyl ether copolymer, and the composite material has cold resistance of not more then −30° C. and fuel permeability of not more than 500 g·mm/m²·day.

2. The composite material of claim 1, wherein the composite material has cold resistance of not more than −35° C.

3. The composite material of claim 1 wherein the crosslinked fluorine-containing silicone rubber particles have a functional group having reactivity with the fluorine-containing rubber.

4. The composite material of claim 3, wherein the functional group of the crosslinked fluorine-containing silicone rubber particles is a functional group having reactivity in peroxide crosslinking.

5. A fuel impermeable sealing material comprising the composite material of claim 1.

6. A process for preparing the composite material of claim 1, which comprises a step of co-coagulating an emulsion of a fluorine-containing rubber and an emulsion of crosslinked fluorine-containing silicone rubber.

* * * * *

UNITED STATES PATENT AND TRADEMARK OFFICE
CERTIFICATE OF CORRECTION

PATENT NO.       : 8,071,709 B2                                              Page 1 of 1
APPLICATION NO.  : 12/282664
DATED            : December 6, 2011
INVENTOR(S)      : Kishine et al.

It is certified that error appears in the above-identified patent and that said Letters Patent is hereby corrected as shown below:

Title page, item [54] and Col. 1
TITLE:

"COMPOSITE MATERIAL COMPRISING FLOURINE-CONTAINING RUBBER, FUEL-IMPERMEABLE SEALING MATERIAL COMPRISING SAME, AND PROCESS FOR PREPARING COMPOSITE MATERIAL"
should read --COMPOSITE MATERIAL COMPRISING FLUORINE-CONTAINING RUBBER, FUEL-IMPERMEABLE SEALING MATERIAL COMPRISING SAME, AND PROCESS FOR PREPARING COMPOSITE MATERIAL--; and Col. 23, Line 32, Claim 1, "of not more then" should read --of not more than--.

Signed and Sealed this
First Day of May, 2012

David J. Kappos
*Director of the United States Patent and Trademark Office*